Nov. 2, 1971         J. C. RUSSELL, SR         3,616,745

AUTOMATIC DAMPER CONTROL

Filed Oct. 1, 1969

INVENTOR.
JAMES C. RUSSELL
BY
ATTORNEY

United States Patent Office 3,616,745
Patented Nov. 2, 1971

3,616,745
AUTOMATIC DAMPER CONTROL
James C. Russell, Sr., 703 Pennington Ave.,
Thomasville, N.C. 27360
Filed Oct. 1, 1969, Ser. No. 862,882
Int. Cl. F23j 11/00
U.S. Cl. 98—115 R  2 Claims

ABSTRACT OF THE DISCLOSURE

In abstract, a preferred embodiment of this invention is an automatic damper control to open suction lines that remove chips, dust and other debris during operation of wood working type machines and to close the suction lines when the machine is shut down.

---

This invention relates to control devices and more particularly to automatic dampening devices for machines having debris removing suction lines extending therefrom.

In the past, manufacturing plants using suction or vacuum lines to remove dust and other debris from various machine installations have either had all of the lines open at all times during plant operation or had some type of hand operated butterfly type valves or dampers installed at selected points. These hand operated devices, however, cause great problems in that they are usually located out of reach of the machine operator and he has to either stand on the machine or some other object to open and close it. Because of this inconvenience, which in many instances could not be corrected due to the size of the machine, causes operators to leave the valves open. Also if the hand operated damper is closed, the chances are that when the machine is again used, the operator will forget to open the damper thereby clogging the machine and fouling the air thereabout.

Specifically, when wood working type equipment is used, a vacuum or suction line will be run to the machine to dispose of saw dust, wood chips and other debris. Typically in furniture and other wood working mills, the main vacuum line will have a series of lateral branches therefrom to serve the individual machines. Since it is seldom that all of the machines are operated simultaneously, it is desirable, as in other plant installations, to have a valve or dampening means for closing off the unused lines or pipes. Hand valves or dampers have been used but with the normal disadvantage as hereinabove mentioned.

The present invention has been developed after much research and study into the above mentioned problems and is designed to provide a fully automatic damper control which automatically opens when its respective machinery is started and automatically closes when such machinery is stopped. This device is attached to each machine within a manufacturing plant where suction pipes or lines are used. No modification is required to either the suction pipe or the machine to install the device other than connecting a single electric circuit. Because of this improved damper, greater vacuum will be available in the suction system of a plant due to the fact that all non-operating machines will have their dampers closed thereby increasing the pressure on the open lines going to operating machines. This invention is easy to construct, clean and repair and is inexpensive both in initial cost and actual operation. It is used in conjunction with planers, joiners, tenors, stroke sanders and any other type of wood working or other machinery to which a vacuum or suction line system is used to remove waste or undesirable by-products.

It is an object, therefore, of the present invention to provide an automatic damper control for vacuum type suction lines.

Another object of the present invention is to provide an automatic suction pipe opening and closing device for use in conjunction with machinery which needs venting.

Another object of the present invention is to provide a means whereby maximum suction line pressure may at all times be maintained at the operating machines of a multi-machine installation.

A further object of the present invention is to provide a damper control which may be easily assembled and disassembled for cleaning and repair.

An additional object of the present invention is to provide a damper device for machinery suction lines which is opened and closed by actuation of the start and stop controls of an associated machine.

Another object of the present invention is to provide an improved damper control which connects between a machine and its suction pipe without requiring modification to either the pipe or the machine.

Another object of the present invention is to provide an automatic damper control using a solenoid operated air valve to control a double acting cylinder.

Other objects and advantages of the present invention will become apparent and obvious from a study of the following description and the accompanying drawings which are merely illustrative of the present invention.

Figure 1:
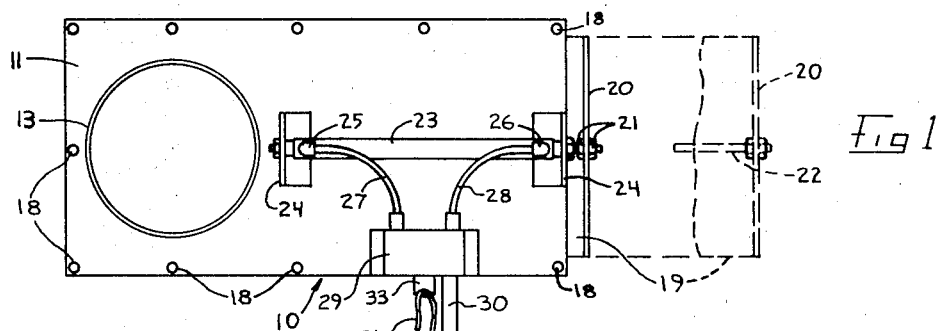
FIG. 1 is a top plan view of the automatic damper of the present invention.

With further reference to the drawings, the automatic damper control indicated generally at 10 is constructed from a pair of matching plates 11 and 12 which have aligned circular openings in one end. About each of these openings is fixedly secured an outwardly projecting cylindrical collar seen at 13 attached to upper plate 11 and 14 attached to lower plate 12 as disposed in the drawings.

Figure 2:
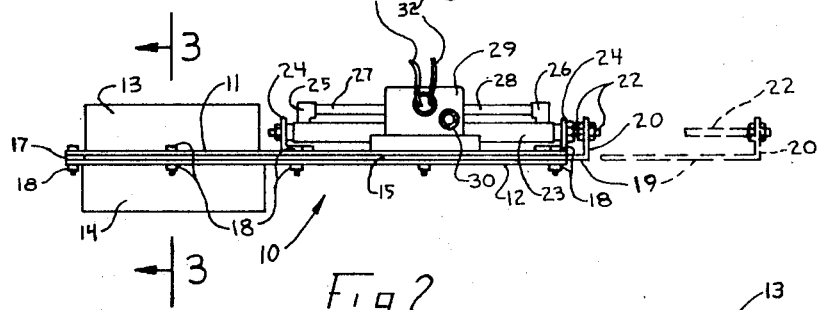
FIG. 2 is a side elevational view of such device.
Figure 3:
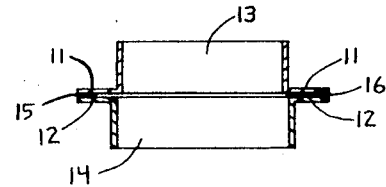
FIG. 3 is a section taken through lines 3—3 of FIG. 2.
Figure 4:
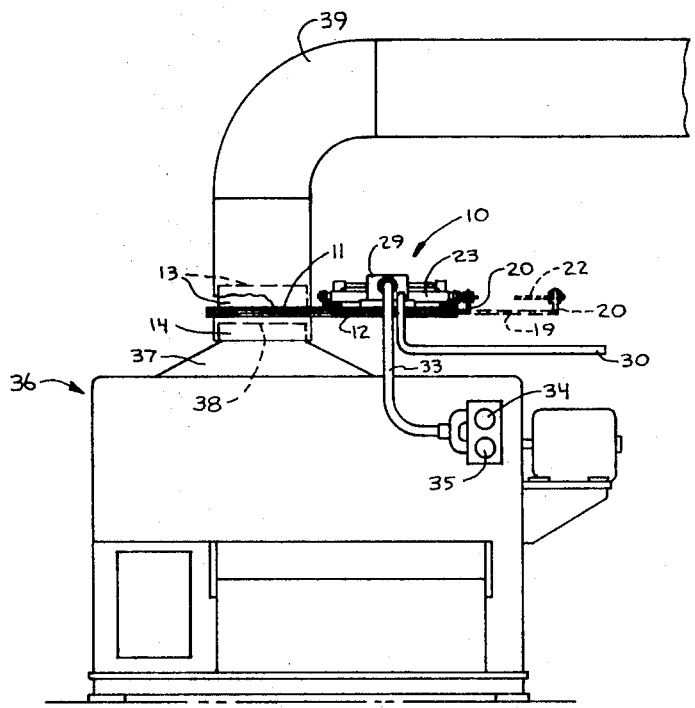
FIG. 4 is a side elevational view of the present invention installed on the hood of a typical modern wood working machine.

Plates 11 and 12 are disposed in spaced parallel planes and are held in such relation by side spacers 15 and 16 and end spacer 17. This entire assembly forms an envelope or slot and is held together by removable means such as bolts 18. A generally flat damper member 19 is so sized as to slideably fit into the envelope or slot defined by plates 11 and 12 and spacers 15, 16 and 17. Thus it can be seen that when the damper is in the position shown in solid lines in FIGS. 1, 2 and 4, the opening through plates 11 and 12 will be closed, and when the damper is in the position shown in dotted lines in such figures, the opening through the plates will be unobstructed.

The outer edge of the damper is bent 90 degrees to form a flange 20. To this flange is fixedly secured by means such as nuts 21 one end of piston rod 22. This rod passes into double acting air cylinder 23 which, being of standard construction, can drive the piston rod selectively outwardly or inwardly.

A pair of angle iron shaped mounting brackets 24 rigidly support air cylinder 23 to plate 11.

Fittings 25 and 26 communicatively connect air pressure lines 27 and 28 to the interior of cylinder 24 on either side of the piston (not shown) connected to piston rod 22.

The end of air pressure lines 27 and 28 opposite their respective connectors are communicatively attached to a standard solenoid operated air valve 29.

An air inlet line 30 operatively connects to the air valve 29 at one end and to a source of compressed air (not shown) on the other end. The electrical leads 31 and 32 which are operatively connected to the solenoid at one end pass through the conduct 33 seen in FIG. 4 and are operatively connected to the start-stop buttons 34 and 35, respectively, of the wood machine indicated generally at 36.

In actual use of the automatic control damper of the present invention, the standard suction pipe or line 39 is removed from operative engagement with the hood collar 38 and the collar 14 of the automatic damper of the present invention is placed thereover. The pipe 39 is then inserted over collar 13 just as it had previously been over the hood collar 38. Thus it can be seen that when the device of the present invention is inserted between the machine and its suction pipe, the displacement of such pipe from such machine is only equal to the thickness of plates 11 and 12 and the spacers therebetween. Because of this negligible shift or upward displacement of the suction pipe, the automatic damper control of the present invention can be inserted between any existing machine and suction pipe installation without changing or modifying in any way either unit. The installation time of the present device, because of its simplicity and location is extremely small.

Once installed as hereinabove described, the air hose 30 is connected to a source of air (not shown) located within the plant. Next the wires that carry electrical current to the solenoid are operatively connected in the normal fashion to the standard start-stop switch of the machine in such a manner that when the start button is pushed, the solenoid will activate to channel air from intake line 30 through line 27 and into the innermost end of cylinder 23. This air pushes the piston (not shown) connected to piston rod 22 outwardly to its limits thus opening the baffle or damper 19 by sliding it outwardly in its envelope like housing. The wiring of the solenoid is also designed so that when the stop button of the machine is pushed, the solenoid will shift the air flow or pressure from line 27 to line 28 thus the piston and piston rod close the damper 19 which crosses and closes the opening between the collars 13 and 14. From the above, it can be seen that by simply activating the start and stop buttons 34 and 35 of machine 36, the damper between the suction line 39 and the machine hood 37 will be selectively either opened or closed in accordance with the operating condition of the machine.

Due to the different relative smaller sizes of collars 13 and 14, the latter will slip over the hood collar and the former will slip inside of the suction or vacuum line thereby eliminating the necessity for adapters and the like and also eliminating the need for expensive and time consuming installation problems.

A double acting hydraulic cylinder could, of course, be substituted for the double acting air cylinder. Likewise, a spring loaded, single acting air or hydraulic system, as well as other similar motivating means, could be used to control the position of the damper valve 19.

It is obvious that the present invention has the advantage of being quickly installable on any standard size machine hood and to eliminate the possibility of human error in control of the device by making it completely automatic. The present invention is also inexpensive to manufacture as well as being low in maintenance cost due to simplicity and ease of dismantlement and assembly.

The terms "upper," "lower," "inner," "outer" and so forth have been used herein merely for convenience to describe the damper and its parts as oriented in the drawings. It is to be understood, however, that these terms are in no way limiting to the invention since the device may obviously be disposed in many different positions when it is used.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. A damper control comprising: a machine which produces loose debris while in operation; an exhaust hood having a debris inlet opening operatively attached to said machine and a debris exhaust opening; a support housing slideably mounting a gate type damper valve operatively attached to the exhaust opening of said hood; a suction line operatively attached to said damper support housing whereby said housing is operatively mounted between said exhaust hood and said suction line; a double acting air cylinder mounting on said housing and operatively connected to said damper valve; an electrically controlled air valve operatively connected to said air cylinder; an electrical start-stop switch for controlling the operation of said machine; and electrically conductive means connecting said air valve to said stop-start control of said machine whereby the opening and closing of the damper valve may be coordinated with the operation condition of the machine.

2. The damper control of claim 1 wherein the activating means for the air cylinder is an electrically operated solenoid type valve.

References Cited

UNITED STATES PATENTS

| 988,482 | 4/1911 | McCune | 251—326 X |
| 2,790,309 | 4/1957 | Wenzelberger | 251—30 X |

MEYER PERLIN, Primary Examiner

W. C. ANDERSON, Assistant Examiner

U.S. Cl. X.R.

144—252 R